United States Patent [19]

Ochiai et al.

[11] 4,282,173
[45] Aug. 4, 1981

[54] METHOD FOR MANUFACTURING REFRACTORY MATERIAL HAVING NUMEROUS THROUGH PORES EXTENDING IN A CERTAIN DIRECTION

[75] Inventors: Tsunemi Ochiai; Goro Saiki; Teruo Shimao, all of Himeji; Toshitaro Saito, Toyokawa; Shizuo Nakanishi, Okazaki; Takeo Saeki, Toyokawa, all of Japan

[73] Assignees: Nippon Steel Corporation; Isolite Insulating Product Company Limited (Isolite Kogyo K.K.), both of Tokyo, Japan

[21] Appl. No.: 959,731

[22] Filed: Nov. 13, 1978

Related U.S. Application Data

[63] Continuation-in-part of Ser. No. 869,445, Jan. 16, 1978, abandoned, which is a continuation of Ser. No. 714,970, Aug. 16, 1976, abandoned, which is a continuation-in-part of Ser. No. 559,524, Mar. 18, 1975, abandoned.

[30] Foreign Application Priority Data

| Oct. 31, 1974 | [JP] | Japan | 49-125895 |
| Oct. 31, 1974 | [JP] | Japan | 49-125896 |
| Oct. 31, 1974 | [JP] | Japan | 49-125897 |
| Oct. 31, 1974 | [JP] | Japan | 49-125898 |
| Oct. 31, 1974 | [JP] | Japan | 49-125899 |
| Oct. 31, 1974 | [JP] | Japan | 49-125900 |

[51] Int. Cl.$^3$ .............................................. C04B 33/32
[52] U.S. Cl. .................................... 264/59; 264/71; 264/317; 264/DIG. 44; 425/DIG. 12
[58] Field of Search .............. 264/59, 71, 72, 317, 264/DIG. 44; 425/DIG. 12

[56] References Cited

U.S. PATENT DOCUMENTS

| 2,506,244 | 5/1950 | Stopka | 264/59 |
| 3,437,723 | 4/1969 | Habermann | 264/59 X |
| 3,533,753 | 10/1970 | Berger | 264/59 X |
| 3,539,667 | 11/1970 | Nameishi | 264/59 X |

Primary Examiner—Philip Anderson
Attorney, Agent, or Firm—Toren, McGeady and Stanger

[57] ABSTRACT

The present invention relates to a method for manufacturing a refractory material having numerous through pores in a certain direction. The refractory material is manufactured by covering a woven fabric composed of combustible weft and/or warp threads with a slurry of a refractory material, and then drying and baking the coated fabric to burn out the combustible yarns so that the desired through pores may be obtained in directions corresponding to the direction of the burned out weft and warp threads.

12 Claims, 9 Drawing Figures

METHOD FOR MANUFACTURING REFRACTORY MATERIAL HAVING NUMEROUS THROUGH PORES EXTENDING IN A CERTAIN DIRECTION

CROSS REFERENCE TO RELATED APPLICATIONS

This application is a continuation-in-part of co-pending application Ser. No. 869,445, filed Jan. 16, 1978, now abandoned, which, in turn, is a continuation of application Ser. No. 714,970, filed Aug. 16, 1976, now abandoned, which, in turn, is a continuation-in-part of application Ser. No. 559,524, filed Mar. 18, 1975, now abandoned.

BACKGROUND OF THE INVENTION

1. Field of the Invention

This invention relates to a method for making porous refractory materials.

2. Description of the Prior Art

Refractory material having numerous permeable pores has been widely used in the steel making industry and in other fields.

For instance, refractory material having a large number of permeable pores is conventionally manufactured by mixing powder of a highly refractory material having a controlled grain size with binding clay or an organic binder and then forming it under pressure, followed by drying and baking. The cavities produced within the brick provide permeability. However, such pores do not have directionality. Because of this lack of directionality, the pores are present in directions other than one specific certain direction and are of no use of the passage of gas and, instead, are markedly detrimental to the corrosion resistance, for instance, in the case of porous plugs for the gas bubbling of molten metal. Further, it is practically impossible to control the size of the pores in this manufacturing method without the sacrifice of refractoriness, abrasion resistance, strength, and other desired properties.

Another prior art process is shown in U.S. Pat. No. 3,060,015, in which a molded plate is bored with numerous needles and then dried and baked. A manufacturing method of such refractory material is disclosed in Japanese Patent Publication No. Sho 38-26836. The method of this Japanese patent publication is such that a number of needle-like holes are bored by passing needles (of various forms) through an original plate made of molding material by press molding, and then drying and baking.

In this method, however, the plate strength determines the size of the bores and, accordingly, small pores are difficult to obtain. Another disadvantage of this method is that the through pores are closed if an external force acts on the plate. Also, needles are passed through the original plate and the size of the needles is determined by the strength of the original plate and, accordingly, minute pores are difficult to form. Moreover, if an external force is applied by chance to the original plate having many holes before drying, permeable holes are blocked and closed. Accordingly, the manufacturing method must be free from external force, such as, vibration.

Another method is disclosed in U.S. Pat. No. 3,539,667, in which combustible fibrous substances are disposed in the molding flask and a slurry of refractory material is filled into the mold, and then dried and baked. In this method, an incombustible substance, for instance, wire, is introduced and taken out before baking. Specifically, a refractory material in slurry state is filled in a mold with combustible fibrous material arranged in a prescribed direction fixed thereto, removed from the mold, followed by drying and baking, so that permeable pores are obtained by combustion of the combustible matter.

U.S. Pat. No. 2,506,244 discloses the method of adhering a ceramic mass to a network of wooden rods and wefts to form a cylindrical body by winding said network and to dry and fire said body to obtain through pores corresponding to said wooden rods. The feature of this method is to produce a cylindrical body of ceramic material provided with narrow passages, parallel to the axis of said body. However, since wooden rods are used, it is difficult to produce extremely narrow passages.

In another method, through pores are obtained by filling a raw material in a molding flask provided with disposed incombustible material therein, such as, for example, wire, which is taken out before baking.

These methods, however, have the drawback that with the finer fiber or wire, the arrangement of fiber or wire becomes more complicated. Thus, in these manufacturing methods, as the fiber or wire becomes thinner, the work involved in arranging the fiber or wire becomes more complicated. The number of fibers or wires per unit area is extremely limited and, accordingly, the size of the fiber (or wire) must be relatively large in order to provide the brick with the desired permeability.

Accordingly, in the conventional manufacturing method of refractory material having a number of permeable pores extending in one direction, it is difficult to arbitrarily control the number of pores per unit area and the size of the pores and it is practically impossible to provide minute pores in a large number.

SUMMARY OF THE INVENTION

Applicants have discovered a new method for producing porous refractory material which avoids the above difficulties. Particularly, applicants have found that this can be accomplished by impregnating a multiplicity of layers of a woven fabric with a slurry, paste, or powder of the refractory material prior to the heating step, wherein the woven fabric has warp and/or weft fibers which are combustible. On heating the thus impregnated refractory material, the combustible portion of the fabric is removed by burning. This produces a multiplicity of pores extending through the shaped article which corresponds to the thus removed fibers.

The combustible fibers have a diameter of no greater than 500 microns and the layers of the fabric may be formed by either rolling the fabric or folding it upon itself.

More particularly, in the process of the present invention, a woven fabric, which preferably differs in the relative number of wefts and warps therein, is continuously wound up on a roll while simultaneously interposing a refractory material in paste or slurry form between the layers of the fabric. This results in the formation of a columnar or cylindrical laminated body of successive layers of the fabric and the refractory material. Thereafter, the laminated body is dried and fired to burn off the wefts or the wefts and warps and to thereby create numerous narrow pores going completely through the body. These through pores can be directed in a specific direction, e.g., parallel to the axis of the columnar body.

In a preferred embodiment of the present invention, the fabric is wound up on a roll which roll is partially immersed in a bath of a slurry of the refractory material. At the same time, the bath is vibrated. This serves to remove air bubbles which may become entrapped between the layers of the fabric, minimizing any strain between the individual layers. This allows the formation of a dense and uniform roll.

Furthermore, in the present invention, the firing is carried out by heating the surfaces of the dried laminated body perpendicular to the through pores which are to be formed by insulating the surface parallel to the through pores to burn off the combustible fibers. This procedure avoids the build-up of gases in the interior portion of the body and thus helps to avoid the occurrence of cracks.

DETAILED DESCRIPTION OF THE INVENTION

The present invention relates to a method for manufacturing refractory material having numerous pores extending completely through the material.

Refractory material having a large number of through pores have been widely used as tuyere bricks to introduce gas into a molten metal and lining bricks of a luminous wall furnace for combustion of diffused fuel and air in a large range.

In the present invention, the preparation of a laminated material is effected by laying woven fabrics over each other and interposing refractory material between the fabrics and between the yarns of the fabrics. This results in the provision of numerous pores permeable in one direction by burning out the warp and/or weft fibers of the laminated material through drying and baking and, further, increasing of the strength of the laminated material.

In the following, the present invention will be explained concretely with reference to the annexed drawings.

The present invention uses, as a material to form numerous permeable pores extending in one direction, a woven fabric composed of weft and warp threads of combustible fiber, or a woven fabric composed of weft threads of a combustible fiber and warp threads of a difficultly combustible or incombustible fiber.

Figure 1:
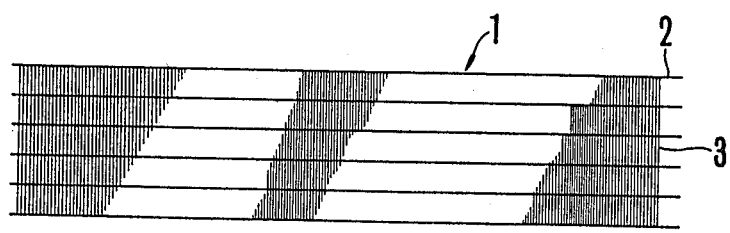
FIG. 1 is a schematic view of a woven fabric composed of combustible fiber.

More specifically, suitable woven fabrics include those with weft and warp threads composed of natural fibers, such as, cotton yarn and silk yarn or of synthetic fibers, such as, nylon or vinylon, or a woven fabric with weft threads composed of the above combustible fibers and warp threads composed of incombustible fibers, such as, carbon, zirconia, and ceramic fibers. It is, of course, understood that in a woven fabric, the weft and warp yarns are substantially perpendicular to one another. This is an example in which the weft threads form the permeable pores as described later. FIG. 1 shows an example of a woven fabric composed of combustible fibers.

When such woven fabrics are used to manufacture a refractory laminated material by the method as described hereinafter, through pores are formed in the position corresponding to the warp and weft. If gas is passed through the pores corresponding to the weft for the purpose described later, the pores corresponding to the warp are essentially useless, increasing the porosity of the refractory laminated material but reducing the strength thereof. Such difficulties may be lessened if the weft threads 3 are used in a greater number relative to the warp threads 2 in the woven fabric. The number of weft threads 3 determines the number of pores and the size thereof determines the size of the permeable pores produced in the brick. The number and size of the pores determine the permeability of the refractory of the present invention.

Although not shown in the drawing, when yarns of an incombustible fiber are used as the warp, pores in the position corresponding to the warp do not remain but the incombustible fiber acts as a composite material and increases the strength of the laminated refractory material. In such a woven fabric, the warp and weft may be used in equal number. The fabric used for the present invention may be woven with weft and/or warp threads of, for example, 1 mm or larger diameter, but may also be woven with yarns of dozens of microns, for instance, $40\mu$ diameter. Generally, the weft and/or warps are composed of filaments when the diameter is less than 50 microns, and twines when the diameter is not less than 50 microns. In this manner, the present invention produces a remarked effect surpassing the aforesaid conventional methods when weft and warp threads under $500\mu$ and preferably under $300\mu$ are used. Particularly, utilizing the present invention, it is possible to produce a porous refractory material having from about 2000 to 8500 pores per $cm^2$.

Figure 4:
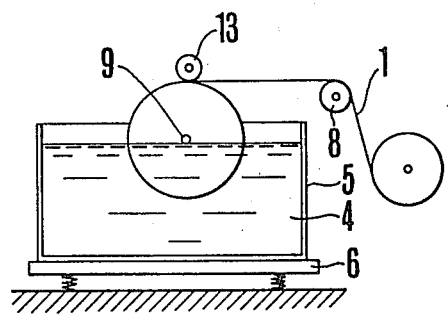
Figure 5:
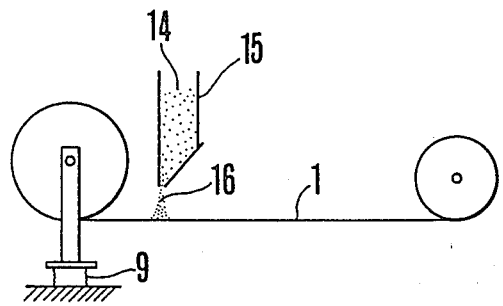
FIG. 5 is a schematic view showing equipment for manufacturing a refractory material using a powdery refractory material.
Figure 6:
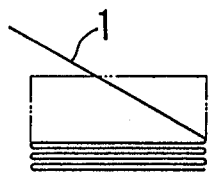
FIG. 6 is a schematic view showing equipment for manufacturing a laminate block by folding a continuous woven fabric.

According to the present invention, the above woven fabric in continuous form is wound as shown in FIGS. 2, 3, 4 and 5, for example, or folded as shown in FIG. 6, or piled up after cutting to the desired length. While the woven fabric is lapped over as described above, a preliminarily adjusted refractory material in a slurry or paste state or powdery refractory material is interposed in the spaces between the thus formed layers of the woven fabric.

Figure 2:
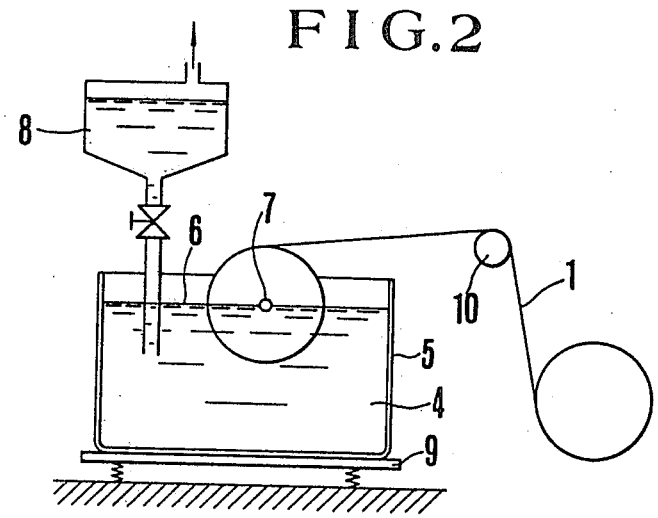
FIG. 2 is a schematic view showing equipment for manufacturing a refractory material according to the present invention.
Figure 3:
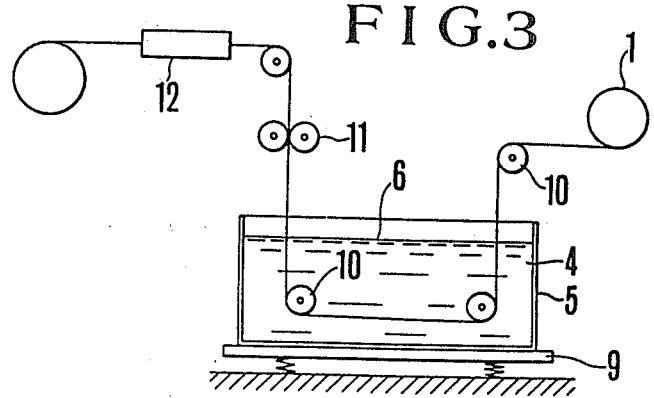
FIGS. 3 and 4 are schematic views showing equipment for manufacturing a refractory material using a slurry or pasty refractory material.

In the case of a refractory material in slurry or paste state, the woven fabric before lamination is covered with the refractory material as shown in FIG. 3, or as shown in FIG. 5, and lamination is performed, such that the powdery refractory material is placed on the surface of the woven fabric. Another means for interposing refractory material in a slurry or paste state or a powdery refractory material between laminated woven fabrics is by forming layers of the continuously woven fabric by winding or folding and placing the aforesaid refractory material applied by dropping, spraying, or painting over the periphery or upper surface of the layers of fabric. As another means, at least part of the periphery of the wound laminated material is dipped into the refractory material for coating therewith, as shown in FIGS. 2 and 4.

More particularly, according to the present invention, a continuous woven fabric interposed with refractory material in paste or slurry state is laminated with the use of the winding procedure as shown in FIG. 2 or FIG. 4. As shown in the figures, the winding procedure is carried out by placing a roll of the woven fabric for lamination outside of the bath of refractory material and winding the fabric onto a roll which is partially immersed in the slurry or paste and maintaining such partial immersion of the laminate during winding.

During the winding procedure, a part of slurry or paste refractory material is successively lapped over the said refractory material. The warps and wefts of the woven fabric are crossed over one another to form interstitial spaces which contain air bubbles. However, since the woven fabric is lapped as above mentioned, said spaces are filled with the refractory material which replaces the air. Since the laminate is rotated during the winding, the surface of the woven fabric is successively covered with refractory material to increase the diameter of the wound laminate.

The winding lamination procedure shown in FIG. 3 winds a woven fabric which has been previously immersed in the refractory material. According to this procedure, the woven fabric is immersed in the refractory material to cover both sides thereof, so that the air bubbles contained in the texture are difficult to remove in winding and thus, a wound laminate having numerous through pores is difficult to obtain. Moreover, in this procedure, it is necessary to use a roller (10) in the bath to immerse the woven fabric therein, so that the refractory material adheres to the surface of the said roller and partially changes the surface condition thereof, which, in turn, changes the tension of the woven fabric and the winding conditions and, as a result, a proper winding cannot be performed. For these reasons, the winding procedure as shown in FIG. 3 is not desirable from the standpoints of workability as well as the quality of the product obtained.

Refractory materials suitable for use in forming the laminated layer in accordance with the present invention include those commonly used in ceramic industries, such as, magnesite, alumina, zircon, cordierite, silicious stone, silicon carbide, and silicon nitride. These may be employed separately or in combination in accordance with the specific end purpose of the laminated refractory material. For instance, a mixture of alumina, zircon and silicon carbide in a specific composition gives a shaped refractory article having high refractoriness and excellent resistance against spalling which is suitable for use in the gas bubbling of molten steel.

Referring to the particle size of the refractory material to be employed, it is necessary that more than 30% of the particles be able to pass through the spaces in the woven fabric as fine as possible, in order to fill the spaces of the fabric. Desirably, the particles are with the refractory material during laminating in order to obtain a laminate having a high density, and to minimize segregation of the particles, and to cover the surface of the laminate uniformly with the refractory material. Binders, such as, sodium silicate, aluminum phosphate, alumina sol and high aluminous cement may be added separately or in combination.

As a practical example, in producing a shaped refractory article for the use in gas bubbling of molten steel from alumina, a suitable particle distribution of alumina is 40 parts of less than 44 microns, 30 parts of between 44 and 149 microns and 30 parts of between 149 and 210 microns. 10 parts of alumina sol and 15 to 18% of water is added thereto as a binder to form refractory material into a slurry.

The amount of water may be changed in accordance with the kinds of refractory material and the woven fabric to be employed as well as the amount of woven fabric in laminating. When the amount of water is large, the refractory material is in slurry state, and when the amount of water is small, the refractory material is in a paste state. The amount of the refractory material adhered to the wound laminate per pass increases as the amount of water is decreased.

On laminating the said woven fabric, tension may be applied to the woven fabric, the amount of tension being below, of course, the tearing strength of the woven fabric, to drive out air bubbles remaining between the yarns of the fabric by the fine particles of refractory material penetrating into the woven fabric from the lower portion thereof when laminating. Another favorable effect of this tension is that fine particles of the refractory penetrate into the spaces in the fabric and the refractory material interposed between the woven fabrics is distributed uniformly, and the laminated material is well shaped, and the density is increased. As means for applying such tension, the woven fabric can be laminated while deforming it with a press roll 13 as shown in FIG. 4.

Another important feature utilized in the present invention to obtain uniformly high density and good shape, is to apply vibration to the woven fabric and/or the refractory material during the winding as shown in FIGS. 2 and 4.

As seen from the figures, the vibration may be applied to tank 5 containing the slurry or paste state refractory material and to transfer a part of said vibration to reel 7 where the lamination is carried out. This facilitates penetration of the refractory material into the texture or spaces between the fibers of the woven fabric and uniform distribution of the refractory material in the laminate to form a dense laminated body having a good shape and no strain. Without the vibration, the diameter of the laminate is frequently enlarged at both sides thereof which is an undesirable shape. Also the slurry or paste of the refractory material in tank 5 is deaired due to the vibration.

Another advantage of applying the vibration is that, since the refractory material contains a large amount (more than 30%) of fine particles, the refractory material becomes fluid due to thixotropy and its viscosity is reduced as a result of the vibration. Also, the water content can be reduced to obtain a slurry or paste state refractory material having the desired viscosity, the pores formed chiefly due to the presence of water as opposed to the pores formed from the fibers in the laminated body, can be reduced and the laminate thus made more dense. Further, the boundaries which frequently form between the layers of the laminate during winding can be completely eliminated.

To obtain the above effects, the vibration should have a frequency of 900 to 10,000 Vpm and an amplitude of 0.1 to 1.0 mm.

When a slurry or pasty refractory material is used, the refractory material may be treated under reduced pressure in a specific container for the purpose of removing air bubbles already interposed in the refractory material, as shown in FIG. 2.

The air bubbles tending to remain between the yarns during the lamination may be removed by treatment under reduced pressure, for example, by suitable conventional equipment (not shown).

The above means for application of tension to the woven fabric, deformation of laminated material with pressure roll, and treatment of the refractory material under reduced pressure may be performed in combination with the vibration.

The above slurry or pasty refractory material or powdery refractory material may be used separately or mixed with other additions depending on the application of the formed refractory material having the permeable pores or the place of application. For instance, for a porous plug for gas bubbling of molten metal, additions, e.g., alumina, zirconia, silicon nitride, silicon carbide, or other materials are favorable. The grain size of the refractory material is preferably such that at least 30% of the total amount of refractory material is smaller in grain diameter than the internal space between yarns.

The refractory material laminate obtained based on the above means is dried and baked without any further treatment or after pressure forming.

In the case of a laminate obtained by interposing a slurry or pasty refractory material between the woven fabrics, when it is formed under pressure as required, it is press-formed while the moisture in the laminate is thoroughly removed, i.e., in the pretreatment process of preliminary baking, or press-formed after the moisture is removed.

When the moisture removing and press-forming are simultaneously done, the isostatic press type may not be used.

As a result of the pressure forming, fine-grained refractory material enters into the woven fabrics or internal space thereof filling the total laminate under pressure, and a dense refractory laminate is thus obtained.

The above laminate is then dried and baked. In one such process, the laminate is heated up to 600° C. at a relatively slow rate for drying, and the moisture in the laminate is discharged during this period, and the combustible fiber is lost by burning. Subsequently, it is baked at temperatures from 1500° to 1800° C. The particles of the refractory material are sintered together during the baking and are thus provided with strength for use as a refractory block.

In another drying-baking process in accordance with the present invention, the laminate is dried at substantially normal temperature or at temperatures under 110° C., thus removing the moisture in the laminate. Subsequently, the laminate is preliminarily baked at a temperature up to 600° C. to remove a part of the residual moisture and then burning out the combustible fiber in the laminate. Then, at a temperature from 1500° to 1800° C., the laminate is ultimately baked. In this drying-baking of the laminate (or preliminary and ultimate baking), it must be considered that moisture and combustible fiber gasify when heated and expand in volume.

The expansion of moisture and combustible fiber does not cause any difficulty if the volume of the gas given off from the laminate is balanced by that of the gas evolved within the laminate. However, if the volume of the evolved gas increases, the gas pressure causes cracks and breaks the laminate.

This bursting is more frequently caused by a combustible synthetic fiber. To overcome this difficulty in drying or preliminary baking, the surface parallel to the permeable pores formed in the laminate is insulated and the surface perpendicular to the permeable pores is heated, resulting in a satisfactory laminate. That is, the combustible fiber is gasified successively from the heating surface and the gas is discharged from the heated surface through the pore path formed.

The surface parallel to the through pores to be formed in the laminate, i.e., parallel to the axis of the column, is insulated by covering it with ceramic fibers or ceramic wools which are commercially available. Combustible yarns are completely gasified at a temperature range between 250° C. and 600° C., depending on the kind of yarn employed, so that such ceramic fibers or wools can be used for the insulation.

In heating one of the end surfaces of the laminate by insulating the other sides thereof, a temperature gradient is formed which is nearly parallel to the heating surface of the laminate, so that there is essentially no chance for the inner portion of the laminate to become gasified prior to the gasification of yarns on the side being heated. Thus, the occurrence of bursting due to the gas pressure evolved during heating can be completely eliminated.

Figure 8:
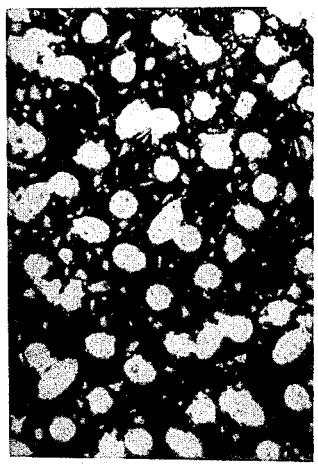
FIG. 8 is a microphotograph of the cross-section of a refractory material according to the present invention.
Figure 9:
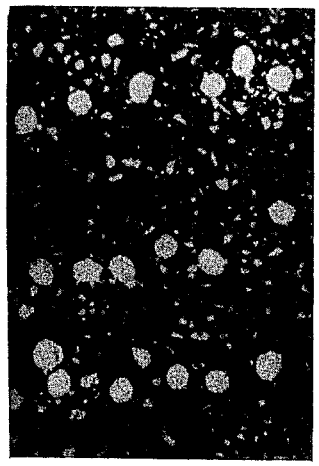
FIG. 9 is another microphotograph of the cross-section of a refractory material composed of zircon according to the present invention.

In the refractory material having through pores obtained in the manner described above, small pores are formed in the substantially uniformly distributed state as shown in the photographs in FIGS. 8 and 9. The size of these pores corresponds to the diameter of the weft of a woven fabric. Accordingly, the size of the through pores is determined by the weft of the woven fabric. The problem in this case, however, is that, if pores as small as 20 to 30$\mu$ are to be formed, there is no woven fabric composed of such fine weft threads to provide such small pores. On the present technological level, a woven fabric may be composed of weft threads as fine as 40$\mu$ as mentioned earlier, but there exists no such woven fabric of less than 40$\mu$ weft threads. The advantage of the present invention will be greatly enhanced if woven fabrics with such fine weft threads are available.

Under this circumstance, if finer through pores are desired, the refractory material having the aforesaid through pores should be impregnated with a liquid containing a carbonaceous composition, for instance, liquid synthetic resin (phenol resin, polyacryl nitrile resin, epoxy resin, divinylbenzene resin, furan resin) or tar, and the refractory should be baked at temperatures around 900° C. in a reducing atmosphere. In this manner, carbon is left to remain in the through pores and ordinary pores, reducing the porosity of the refractory material as well as accomplishing the aforesaid object. The reduction of the porosity, on the other hand, can improve the corrosion resistance of the refractory material.

Figure 7:
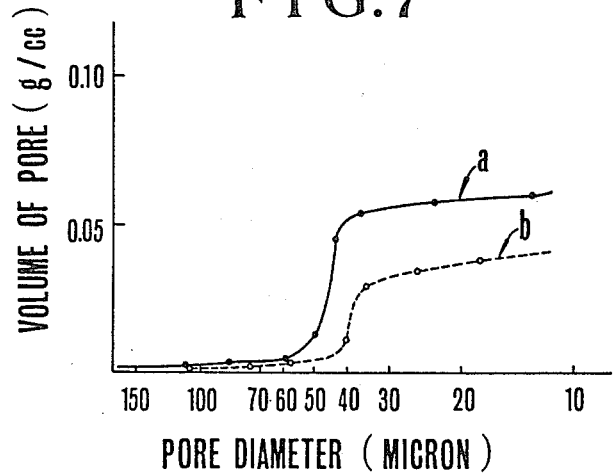
FIG. 7 is a graph showing the relation between the pore volume and pore diameter of refractory materials according to the present invention.

FIG. 7 shows a comparison between a refractory material (curve a) having through pores of 50$\mu$ in diameter obtained by a method of the present invention and the same refractory material (curve b) obtained by baking after being impregnated with phenol resin. By the aforesaid treatment, the diameter of through pores is reduced to 40μ.

FIG. 2 is a process view showing an embodiment of the present invention. A woven fabric 1 wound like a roll is unwound from one end at a constant speed and rewound on a reel 7 disposed in the position of the slurry surface 6 of a slurry tank 7.

While the woven fabric 1 is rewound by rotating the reel 7, the slurry surface is so maintained as to dip the lower half of the rewound woven fabric to be processed into the slurry 4.

The reference numeral 8 indicates a container holding the supply slurry.

In such a manner, the slurry 4 is applied to the woven fabric while rewinding the woven fabric 1 under tension, and the slurry 4 adheres to the surface of the woven fabric 1 as the lower half of the rewound roll-like woven fabric is dipped into the slurry 4. On the thus applied slurry 4, the woven fabric 1 is successively rewound. At this time the slurry exudes from the back face of the woven fabric through the texture, finally reaching the face of the fabric.

If the slurry is applied on the rewound woven fabric in such a manner, air bubbles which otherwise tend to form in the internal space of the fabric are minimized and a dense refractory laminate composed of woven fabric and refractory material is obtained.

The quantity of the slurry 4 applied to the fabric may be controlled by adjusting the tension (rewinding force) or by adjusting the pressing force of a press roll 13 or similar means, by providing a press roll in the rewinding portion of the woven fabric (see FIG. 4).

The woven fabric 4 may be widthwise uniformly coated with refractory material by applying a vibration to the slurry 4 and the frame of a rewound formed body. The reference numeral 9 denotes a vibrator.

Denser laminates may be obtained merely by use of a refractory material slurry of low moisture content which has been previously treated under reduced pressure to eliminate bubbles. Application of vibration to the slurry is effective for maintaining this function with this type slurry.

The refractory material laminate thus obtained may be formed under pressure by an isostatic press, etc., and may thereafter be subjected to ordinary drying and baking.

FIG. 3 is a schematic diagram showing a process for forming into a roll. The woven fabric 1 wound in a roll is unwound from one end at a constant speed, passed through a tank 5 filled with a slurry refractory material 4 where the woven fabric 1 is covered on both the face and back with refractory material. In this case, the tank 5 is placed on a vibrator table 6 for the purpose of accelerating the intrusion of the refractory material and removing air bubbles caught between the yarns. To further increase the above-mentioned effect, the pressure inside the tank may be reduced by means not shown in the drawing. One end of the woven fabric 1 having passed the tank 5 is pulled up from the refractory material and the amount of refractory material (the amount per unit area) adhering to the woven fabric is controlled by pinch rolls 11. Thereafter, the woven fabric is rewound at a substantially constant speed under tension and then dried and baked. The numeral 12 indicates a dehydrating apparatus as required, and 10 denotes a roller.

FIG. 4 shows a modification of the embodiment shown in FIG. 2, in which a pressure roll 13 is added.

FIG. 5 is a schematic view showing a roll forming process. One end of the woven fabric 1 wound like a roll is unwound at a contstant speed and powdery refractory material falls on it. While distributing the refractory powder uniformly on the fabric by applying vibration, the fabric is rewound under substantially constant tension.

In the same figure, the numeral 14 indicates powdery refractory material contained in a hopper 15, below which is provided a slit-form discharge opening 6. By vibrating this hopper 15, refractory material 14 is discharged and dropped by vibrational force. The discharge amount may be controlled by adjusting the vibrational force and the aperture of the discharge opening 16. The numeral 9 denotes a vibrator.

FIG. 1 shows a case in which a woven fabric 1 coated with slurry refractory material is folded into a block. This refractory material laminate is dried and baked as such without any treatment or after being formed under pressure.

It is needless to say that the aforesaid various treatments and means can be applied when the woven fabric is laminated by folding into blocks.

EXAMPLE 1

A refractory material composed of 70% alumina and 30% silicon carbide with controlled grain size (grains smaller than 44μ accounting for 70%) is thoroughly kneaded and turned into a slurry having 15% moisture, and the slurry is put on a woven fabric of nylon yarn (the diameter of the yarn being 40μ, the number of weft threads being about $8500/cm^2$ when the woven fabric is wound) while being wound under tension in accordance with the process shown in FIG. 2. After being wound into a roll, the woven fabric is dried and baked.

FIG. 8 is a microphotograph showing a cross-section of the refractory material having through pores extending in one direction. The circular or oval white spots indicate through pores, and the black matrix and angular white spots indicate refractory material.

The permeability of the refractory material is 0.7 $cm^3 \cdot cm/cm^2 \cdot sec \cdot cm \cdot H_2O$. This refractory material is used as a porous plug for gas bubbling of molten steel. The result is such that gas bubbling of molten steel is conducted without any difficulty and, moreover, the resistance to erosion, spalling, and steel penetration is excellent, the life of the plug being about 5 to 7 times as long as that of a conventional plug.

EXAMPLE 2

Zircon with controlled grain size to contain 40% of under 44μ, 30% of 44-149μ, and 30% of over 149μ, is thoroughly kneaded and turned into a slurry having 18% moisture. The slurry is put on a woven fabric of nylon yarn (the diameter of the yarn being 80μ and the number of weft threads being about $2000/cm^2$ when the woven fabric is wound) while the fabric is wound under tension in accordance with the process shown in FIG. 2. After being wound in a roll, the woven fabric is dried and baked.

FIG. 9 is a microphotograph showing a cross-section of the refractory material having through pores extending in a single direction, the more well aligned white spots indicating through pores, and the black matrix and angular white spots indicating refractory material. The permeability of the refractory material is 1.2 $cm^3 \cdot cm/cm^2 \cdot sec \cdot cm\ H_2O$.

This refractory material is used as a porous plug for gas bubbling of molten steel. The result is that sufficient agitation is conducted.

EXAMPLE 3

A refractory material chiefly composed of alumina with a controlled grain size of 40% of under 44μ, 30% of 44–149μ, and 30% of over 149μ is kneaded and turned into a slurry having 15% moisture, and the slurry is put on a woven fabric of nylon yarn (the diameter of the yarn being 100μ) while folding in accordance with the process shown in FIG. 6. After laminating into plate form, the woven fabric is dried and baked. This refractory material (114 mm thick) is combustion-tested by supplying a mixture gas of COG (coke oven gas) with air from behind it at a back pressure of 400 mmAq. The result is that a substantially uniform temperature of 900° C. is obtained on the surface of the refractory material.

What is claimed is:

1. In a method for making a shaped article of a refractory material suitable for contact with molten metal, said shaped article being the type wherein a refractory material in paste or slurry state is contacted with a woven fabric and the thus contacted fabric and refractory material are laminated into the desired shape and the liminate preform block thus obtained is heated to dry the block and to burn off the combustible fibers of said fabric and then fired to sinter said refractory material, the improvement which comprises at least one of the weft fibers or the warp fibers of the woven fabric being combustible and said combustible fibers having a diameter between 40 to 300 microns, and wherein a vibration between about 900 to 10,000 Vpm and an amplitude of 0.1 to 1.0 mm is applied to said woven fabric in said laminating step to remove air bubbles from and increase the uniformity of the laminate, and the combustible portion of the fabric is removed by said heating to produce a multiplicity of pores extending through said shaped refractory article corresponding to the thus removed fibers and wherein prior to the burn off, the surface of the body which is parallel to the through pores is temporarily covered with an insulating layer, leaving the end faces perpendicular to the through pores uninsulated and wherein the burn off is carried out by applying heat to the uninsulated end faces so as to exhaust the gas produced by the combustion of the fibers and produce smooth escape of the gas and avoid pressure buildup, and then removing the temporary insulating layer.

2. The method of claim 1 wherein a tension is applied to the woven fabric in said laminating step to form a laminate block, said tension being in the range where the total force provided by the tension and said vibration does not exceed the shearing stress of the woven fabric.

3. The method of claim 1 wherein the refractory material in paste or slurry state is vacuum deaired.

4. The method of claim 1 wherein the laminate block is formed by winding the fabric into a roll, thereby impregnating a part of the laminate block in the refractory material in paste or slurry state.

5. The method of claim 1 wherein the laminate block is wound into a roll, said roll being partially submerged in a bath of a slurry or paste of said refractory material and wherein the vibration is applied to said bath and said roll.

6. The method of claim 1 wherein the refractory material contains greater than about 30 percent by weight of fine particles.

7. The method of claim 1 wherein the number of combustible fibers is sufficient to produce from about 2000 to 8500 pores per $cm^2$.

8. The method of claim 1 wherein the pores produced are less than 300 microns in diameter.

9. The method of claim 1 wherein the pores produced have a diameter in the range from about 40 to 300 microns.

10. The method of claim 1 wherein the surface parallel to the through pores is insulated with ceramic fibers or ceramic wool.

11. The method of claim 1 wherein the body, after firing, is impregnated with a liquid containing a carbonaceous composition and the thus impreganted body is fired again to produce carbon within the through pores and reduce the pore diameter thereof.

12. The method of claim 1 wherein the heating step is carried out by first heating the laminate up to a temperature of about 600° C. for a time period and a rate sufficiently low to avoid bursting the body due to escaping moisture and gases and then heating at a temperature from about 1500° to 1800° C. to effect final baking.

* * * * *